Dec. 27, 1966     D. W. FLYGSTAD     3,294,195
COMPRESSIONAL WAVE SIGNALING APPARATUS
Filed Jan. 25, 1965     2 Sheets-Sheet 1
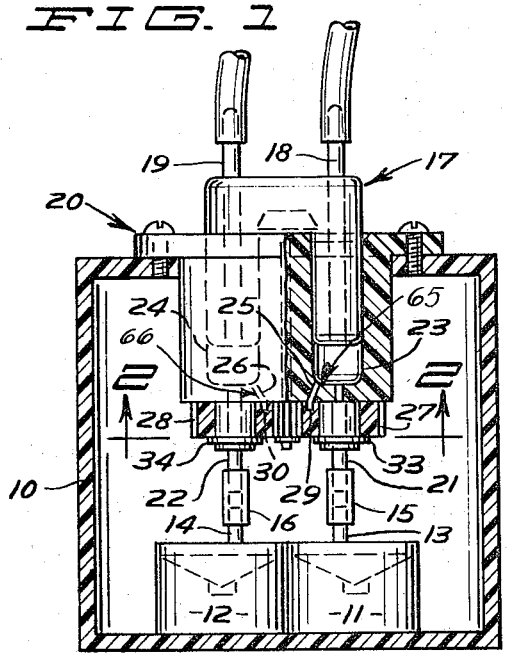
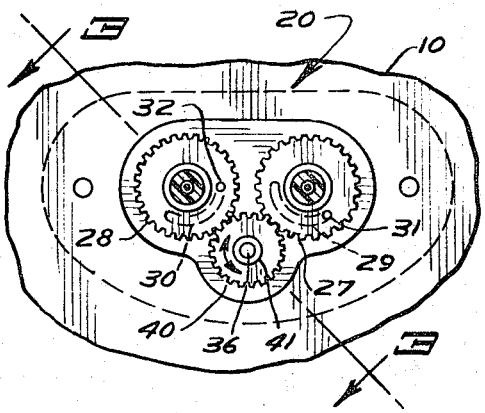
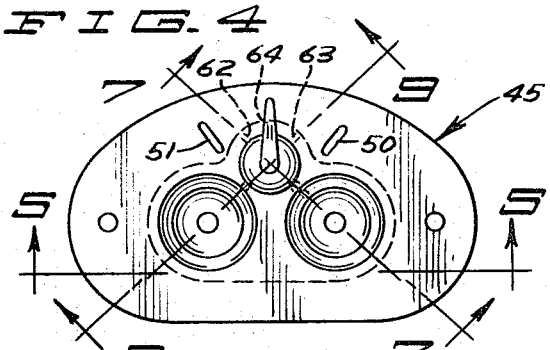
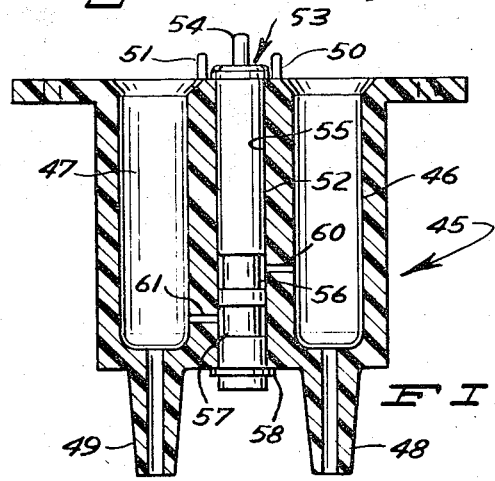
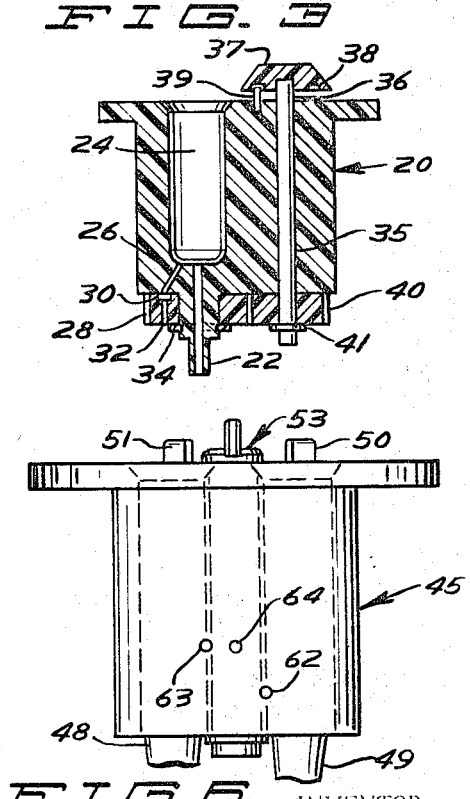
INVENTOR.
DEAN W. FLYGSTAD
BY
Carlsen, Carlsen & Sturm
ATTORNEYS Dec. 27, 1966  D. W. FLYGSTAD  3,294,195
COMPRESSIONAL WAVE SIGNALING APPARATUS
Filed Jan. 25, 1965  2 Sheets-Sheet 2

INVENTOR.
DEAN W. FLYGSTAD
BY
Carlsen, Carlsen & Sturm
ATTORNEYS

United States Patent Office 3,294,195
Patented Dec. 27, 1966

3,294,195
COMPRESSIONAL WAVE SIGNALING
APPARATUS
Dean W. Flygstad, Roseville, Minn., assignor to The Telex Corporation, Tulsa, Okla., a corporation of Delaware
Filed Jan. 25, 1965, Ser. No. 427,800
13 Claims. (Cl. 181—31)

This invention relates generally to compressional wave binaural listening systems and is more particularly directed to a device and apparatus for simultaneously controlling the quality of the compressional wave energy in each of a pair of channels in such systems and apparatus.

In the general class of systems and apparatus with which my invention is concerned, binaural program material is supplied to a plurality of locations in, for example, a public conveyance in the form of electrical energy and means are provided at each listening location for converting the electrical signal program material to compressional wave signals for application to the auditory canals of a listener. One example of such a system may be seen in my copending application Serial No. 417,194, filed December 9, 1964 and entitled "Binaural Listening Device." Reference to my copending application and observance of many existing installations in, for example, commercial airplanes, will indicate that a system is comprised of a source of program material, such as a tape recorder, a plurality of individual listener stations containing transducing devices for providing dual channels of compressional wave energy and a headset that is adapted to be connected to the individual listener stations to convey the compressional wave energy to the auditory canals of the listener.

The present invention is concerned with providing the necessary and desirable features of controlling the quality of the compressional wave energy supplied from the individual listener stations to the auditory canals of a user of the binaural, dual channel program material. In the prior art concerning compressional wave energy, it has been recognized that the quality of compressional wave energy may be affected by providing an aperture of predetermined size with relation to compressional wave energy conducting tubes to allow some of the energy to escape to the atmosphere. This has been observed to suitably characterize the quality of the compressional wave energy and by suitably adjustably controlling the size of the aperture, the band of audible frequencies contained in a compressional wave signal may be characterized to suit the individual listener. It is recognized that the quality of sound energy applied to the auditory canals of the user is a subjective element in the use of listening systems and varies greatly between individual listeners dependent upon their ability to hear sounds of varying frequencies and upon personal preference.

It is an object of my invention to provide improved apparatus for varying the quality of compressional wave energy in a binaural listening system.

A still further object of my invention is to provide improved apparatus for controlling the tone of audible compressional wave energy.

A still further object of my invention is to provide improved apparatus for simultaneously varying the quality of compressional wave energy in a binaural listening system.

These and other objects of my invention will become apparent from a consideration of the appended specification, claims and drawings, in which—

FIG. 1 is a side elevational view, partly in section, of a portion of a binaural listening system incorporating the principles of my invention.

FIG. 2 is a sectional view of a portion of the apparatus shown in FIG. 1 taken along section lines 2—2.

FIG. 3 is a sectional view of the device shown in FIG. 2 taken along section lines 3—3.

FIG. 4 is a top view of a further embodiment of my invention.

FIG. 5 is a sectional view taken along section lines 5—5 in FIG. 4.

FIG. 6 is a side elevational view of the embodiment of FIG. 4.

Figure 7:
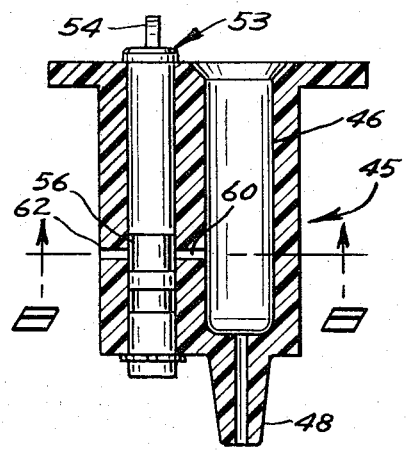
FIG. 7 is a sectional view of the embodiment of FIG. 4 taken along section lines 7—7.

Briefly, my invention comprises a pair of sound conveying chambers that are substantially parallelly disposed. Each of the compressional wave energy conveying chambers is provided with an aperture for bleeding off or venting compressional wave energy therefrom so as to affect the quality of the compressional wave energy flowing through the chambers. Means are provided for adjustably, selectively and simultaneously varying the effective size of the compressional wave energy bleeding apertures in a manner to be described below in connection with the several embodiments illustrated.

Referring now to FIGS. 1, 2 and 3 of the drawings in which like elements are identified by like reference characters, there is shown a sectional representation of a housing 10 that cointains in its lower portion a pair of housings 11 and 12 each containing a loudspeaker or transducing element that are utilized to convert electrical binaural program material to compressional wave energy that is present and appears at sound outlets 13 and 14 respectively. A jack assembly 20 is shown mounted in a suitable aperture therefor on the top of housing 10 and includes a pair of longitudinally elongated plug receiving, sound compressional wave energy transmitting chambers, or ducts, 23 and 24 that are connected through a further duct to inlet portions 21 and 22 that are in turn connected through suitable flexible tubing members 15 and 16 to sound outlets 13 and 14 on housings 11 and 12.

A plug 17 comprised of a pair of substantially parallel sound transmitting ducts is shown disposed in operative position in chambers 23 and 24 and is provided at its upper end with a pair of sound outlets 18 and 19 that are shown connected to a like pair of flexible tubing members. The flexible tubing members are intended to be connected to a headset, or the like, which is provided with a pair of sound outlets for insertion into the auditory canals of a user so as to provide a binaural system as disclosed in the above noted copending application.

Jack assembly 20 also includes a longitudinally extending opening 35 that is disposed substantially parallel to sound chambers 23 and 24. A shaft 36 is rotatably disposed in opening 35 and is provided at its top end with a knob 37 that is rigidly attacched to provide a means for rotatably positioning shaft 36 and includes at its lower end an axially extending arcuate groove 38 that is adapted to coact with a stop member 39 extending upwardly from the body of jack assembly 20 into groove 38 to provide restricted, angular rotational motion of knob 37. A gear member 40 is rigidly affixed to the lower end of shaft 36 by a key member or the like (not shown) and is held in position by suitable locking member 41 that may be, for example, a C-ring disposed in a suitable groove in the lower end of shaft 36.

It may be noted in FIGS. 1 and 3 of the drawing that the lower portion of jack assembly 20 is provided with a pair of boss portions, concentrically disposed with respect to ducts 23 and 24, that extend downwardly far enough to receive a pair of gear members 27 and 28 that are rotatably disposed thereon and held in place by suitable fastening members 33 and 34 respectively. The three gear members are meshed for common actuation as indicated in FIG. 2 of the drawing.

Each of the sound conveying chambers 23 and 24 is provided with a downwardly extending aperture 25 and 26 respectively that extends into cooperative compressional wave energy transmitting relationship with a pair of upwardly opening, axially extending arcuate grooves 29 and 30 of gradually increasing depth, disposed in the upper face of gear members 27 and 28 respectively. Grooves 29 and 30 are provided with an axially extending orifice that extends completely downwardly through gear members 27 and 28 and which is identified by reference characters 31 and 32 respectively.

At this point it might be noted that grooves 29 and 30 in gear members 27 and 28 respectively are of varying depth, gradually decreasing in an arcuate direction from a maximum depth at a position adjacent orifices 31 and 32 to a merging with the top face of gear members 27 and 28 at the arcuately remote end thereof. It may thus be seen that the relative position of grooves 29 and 30 with respect to apertures 25 and 26 extending through the lower portion of jack assembly 20 will determine the size of the duct defined thereby to allow leakage of compressional wave energy to the atmosphere. The relative angular position of gear members 27 and 28 with respect to apertures 25 and 26 thereby provides adjustable bleed ports 65 and 66 and the relative sizes of the ports defined for each of the channels in the binaural listening apparatus may be simultaneously varied through rotation of knob 37 connected to shaft 36 through drive gear member 40. When the size of the bleed ports is at a maximum, a maximum attenuation of the lower frequency components of the compressional wave energy in chambers 23 and 24 is obtained. Reduction in the size of the bleed port varies the relative amount of attenuation of the lower frequencies and the listener may thus, by actuation of knob 37, control the quality of the compressional wave energy arriving at his auditory sense organs to satisfy his subjective requirement for the program supplied from the binaural source of program.

Figure 9:
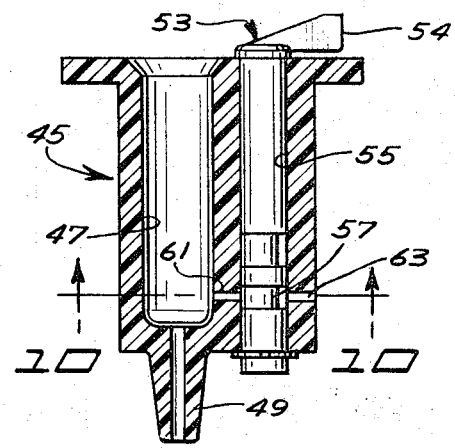
FIG. 9 is a sectional view of FIG. 4 taken along section lines 9—9.
Figure 8:
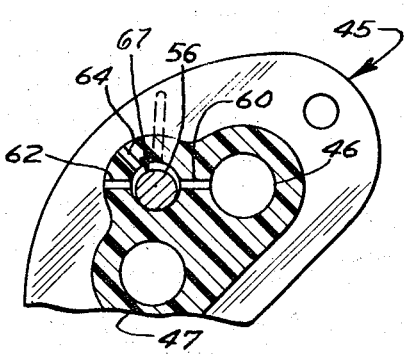
FIG. 8 is a sectional view of FIG. 7 taken along section lines 8—8.
Figure 10:
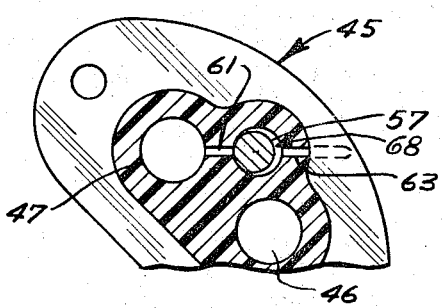
FIG. 10 is a sectional view of FIG. 9 taken along section lines 10—10.

In FIGS. 4 to 10, like reference characters have been applied to like elements and the second embodiment is shown as a jack assembly 45 only, and it will be appreciated that this assembly may be disposed in an enclosure 10 in the same manner as jack assembly 20 is illustrated in FIG. 1 of the drawings.

Jack assembly 45 is shown having a pair of spaced apart, substantially parallel, ducts 46 and 47 having downwardly extending sound inlet portions 48 and 49 respectively. A pair of upwardly extending lug portions 50 and 51 are shown disposed on the top surface of jack assembly 45 for coaction with a valve member to be described below. Jack assembly 45 also includes a longitudinally extending bore 52 that is adapted to slidably receive a valve member 53. Valve member 53 is shown having a lever arm 54 at its top end and is adapted to receive a fastening means 58 at its lower end to maintain valve member 53 in operative rotatable disposition in bore 52. Valve member 53 also includes a shaft 55 that is provided with first and second axially displaced eccentric portions 56 and 57 that are adapted to lie in registration with compressional wave energy ducts connected to the atmosphere and to the interior of the plug receptacles 56 and 57 in a manner to be described below.

Jack assembly 45 is provided with a plurality of bleed ducts that may be seen, on inspection of the several views of the drawing, to define channels for the transmission of compressional wave energy from ducts 46 and 47. A duct 60 is shown extending from plug receptacle 46 to registration with eccentric portion 56 on valve 53. Eccentric portion 56 is also connected to the atmosphere through ducts 62 and 64 extending through the side of jack assembly 45. In a similar manner, eccentric portion 57 on valve 53 is in fluid communication with plug receptacle 47 through duct 61 and to the atmosphere through duct 63.

It may thus be seen that adjustable bleed ports 67 and 68 are provided by coaction between eccentric portion 56 on valve member 53 and duct 60 and by coaction between eccentric portion 57 on valve member 53 and duct 61 whereby the relative angular disposition of valve member 53 with respect to ducts 60 and 61 determines the size of the bleed port connected to plug receptacle portions 46 and 47 on jack assembly 45 whereby the attenuation of the lower frequency components of a compressional wave signal appearing therein may be adjustably controlled.

It may also be noted at this point that the relative angular disposition of eccentric portions 56 and 57 may be varied to provide for either a simultaneous control of the lower frequency components of the compressional wave energy or to provide for an equalization of the lower frequency components with respect to the dual channels of compressional wave energy used in the binaural listening system by inverse operation, i.e. closing of one bleed port while opening the other.

A full understanding of the above described embodiments of my invention will enable one skilled in the art to readily apply the principles to compressional wave systems employing either stereo or monaural sources of compressional wave energy. It should now be clear that my invention concerns the control of the low frequency spectrum of compressional energy in the audible frequency range (a low frequency "roll-off" of 20 db at less than 1,000 c.p.s. has been observed) and that the principles may, under certain conditions, be utilized to control the quality of sound transmitted to only one ear of a listener.

The term binaural, as used in the descriptive material above, should indicate to one skilled in the art that compressional wave energy is supplied to each ear of a listener whether the source of program material is comprised of one or more sources of compressional wave energy.

It is understood that suitable modifications may be made in the structure as disclosed, provided such modifications come within the spirit and scope of the appended claims. Having now therefore fully illustrated and described my invention, what I claim to be new and desire to protect by Letters Patent is:

1. In combination with a dual channel compressional wave energy signal transmission system; an aperture in each of the dual channels; means disposed on each of said apertures for adjustably controlling the size thereof; and means operatively connected to said last named means for simultaneously adjustably controlling the size of said apertures.

2. A tone control for a binaural compressional wave listening system comprising in combination; first and second sources of compressional wave energy; first and second duct means for conveying compressional wave energy to the ears of a listener, each of said duct means including an aperture and valve means associated therewith, said aperture and said valve means comprising an adjustable bleed port; means connecting said duct means to said sources of compressional wave energy; and control means drivingly connected to said valve means, said control means being operative to simultaneously vary the size of the bleed ports formed by said apertures and said valve means.

3. In combination with a compressional wave energy binaural signal transmitting system, signal quality control means comprising in combination; first and second apertures in corresponding compressional wave transmitting ducts, first and second means for controlling the effective size of said apertures, said last named means being disposed adjacent to said apertures, said apertures and said first and second means for controlling the size of the apertures comprising first and second adjustable bleed ports; and means operatively connected to said means for controlling the size of said apertures, said means being operative to simultaneously vary the size of both of said apertures.

4. The apparatus of claim 3 in which the size of the apertures is varied in a manner to provide apertures of variable, equal size.

5. The apparatus of claim 3 in which the size of the apertures is varied in a manner to provide inverse, variable size of one aperture with respect to the other aperture.

6. Sound quality control apparatus for binaural compressional wave signal transmission systems comprising in combination; a body member; first and second sound transmission chambers extending through said body member, said chambers each having sound inlets at one end and sound outlets at the other end and a bleed port extending outwardly through said body member from each of said chambers; and means disposed on said body member for simultaneously varying the size of said bleed ports.

7. In combination with a compressional wave binaural signaling apparatus, a sound quality controlling connector comprising; a pair of sound conveying tubes, each having one end adapted for connection to a source of compressional wave energy and the other end adapted to releasably receive a further sound tube, each of said tubes having an outlet duct extending axially outwardly thereof; and valve means, including rotatable disc members having an arcuate groove of variable axial depth disposed to lie in continuous registration with said outlet ducts and a sound outlet disposed on the ends of said tubes, said valve means being operative to adjustably control the effective size of said outlet ducts.

8. The apparatus of claim 7 in which a driving means connected to simultaneously rotate the disc members is disposed on the sound conveying tubes.

9. In combination with a compressional wave binaural signaling apparatus, a sound quality controlling connector comprising; a pair of sound conveying tubes, each having one end adapted for connection to a source of compressional wave energy and the other end adapted to releasably receive a further sound tube, each of said tubes having an outlet duct extending radially outwardly thereof; a chamber disposed adjacent said sound conveying tubes and in fluid communication with the radially outwardly extending outlet ducts therein; and valve means rotatably journaled in said chamber and operative upon rotation thereof to simultaneously vary the effective size of said outlet ducts.

10. The apparatus of claim 9 in which the outlet ducts are axially spaced and the valve means includes a pair of axially spaced portions disposed to lie in axial registration with said outlet ducts.

11. A tone control for compressional wave listening systems comprising in combination; a source of compressional wave energy; first and second duct means, connected to said source of energy, for conveying said energy to the ears of a listener, each of said ducts including an aperture and valve means associated therewith, said aperture and said valve means comprising an adjustable bleed port for said first and second duct means; and driving means connected to said valve means and operable to simultaneously vary the size of said apertures.

12. The apparatus of claim 11 in which the size of each of the apertures is varied directly by the driving means.

13. The apparatus of claim 11 in which the size of each of the apertures is varied inversely by the driving means.

References Cited by the Examiner

UNITED STATES PATENTS

| | | | |
|---|---|---|---|
| 2,363,175 | 11/1944 | Grossman | 179—107 |
| 2,389,868 | 11/1945 | Olson | 181—24 |
| 2,390,794 | 12/1945 | Knight | 179—1 |
| 2,754,365 | 7/1956 | Walters | 179—107 |
| 2,827,514 | 3/1958 | Murray | 179—1 |

RICHARD B. WILKINSON, *Primary Examiner.*

STEPHEN J. TOMSKY, *Examiner.*